United States Patent [19]

Huntley

[11] Patent Number: 5,221,471
[45] Date of Patent: Jun. 22, 1993

[54] TOOL FOR MAGNETIC TREATMENT OF WATER

[76] Inventor: Lloyd R. Huntley, 2610 N. US 277, San Angelo, Tex. 76905

[21] Appl. No.: 723,007

[22] Filed: Jun. 27, 1991

[51] Int. Cl.$^5$ .............................................. C02F 1/48
[52] U.S. Cl. .................................... 210/222; 210/695
[58] Field of Search ...................... 210/222, 695, 223; 335/306; 55/100

[56] References Cited

U.S. PATENT DOCUMENTS

| | | | |
|---|---|---|---|
| 2,825,464 | 3/1958 | Mack | 210/222 |
| 4,289,621 | 9/1981 | O'Meara, Jr. | 210/222 |
| 4,417,984 | 11/1983 | O'Meara, Jr. | 210/222 |
| 4,564,448 | 1/1986 | O'Meara, Jr. | 210/222 |

Primary Examiner—Matthew O. Savage
Attorney, Agent, or Firm—Marcus L. Bates

[57] ABSTRACT

A tool for magnetic treatment of fluid flowing therethrough has an annular casing that can be connected to a flow conduit to receive flow from the conduit when connected thereto. A plurality of magnets are supported from a plurality of spaced inner and outer holding members within the casing, with a magnet being supported between adjacent holding members. Diametrically opposed outwardly opening sockets in each of the inner holding members telescopingly receive the marginal end of a magnet so that the magnets are arranged with like adjacent poles. The holding members include a plurality of inner holding members and outer holding members, and each inner holding member has opposed sockets for receiving adjoining magnets while each outer holding member has a streamlined end opposed to a socket end. Rods are attached to an enlargement on each outer holding member so that the rods bear against the interior wall of the casing and secure the magnets within the casing. Fluid can flow between the enlargement and the interior of the casing wall and through the magnetic flux associated with each of the magnets.

10 Claims, 1 Drawing Sheet

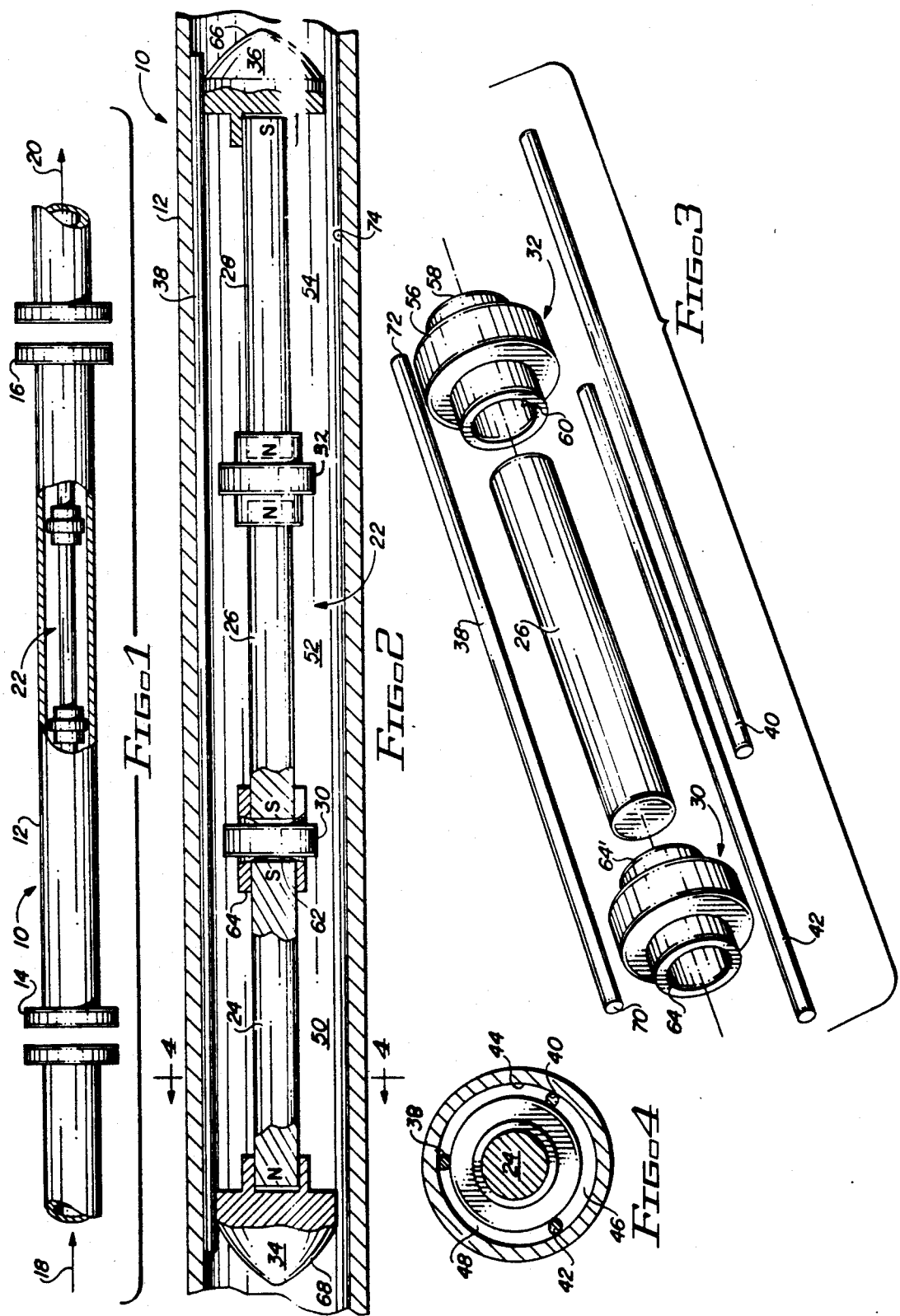

TOOL FOR MAGNETIC TREATMENT OF WATER

BACKGROUND OF THE INVENTION

Treatment to prevent scale in a water system is expensive but often the cost can be reduced by judiciously selecting the type of treatment to which the water is subjected. This is especially so where non-chemical treatment can be used in lieu of chemical treatment. One inexpensive type of non-chemical water treatment is the use of magneto hydro dynamics for modification of a flowing stream of water.

Magneto hydro dynamics is a term used herein to indicate employment of a magnetic field respective to a flowing stream of water to magnetically change the characteristics of the flowing water so that it assumes properties much as if it had been chemically treated with the more expensive chemical treatment substances.

It is usually desirable to avoid the use of chemicals in water treatment, especially where the same results can be achieved by non-chemical treatment. This is especially so when the treatment chemicals undergo chemical reaction with a substance to be removed from water, or where the objectionable substance is to be changed into another form and left in the water. Non-chemical water treatment saves our national resources, conserves energy, and is environmentally more acceptable to people and to our planet.

This invention provides a tool for non-chemical treatment of water, wherein some chemical constituents of the water are rendered more compatible with downstream conditions, as for example, the reduction of scale and deposits on the piping of a water system.

SUMMARY OF THE INVENTION

Broadly, this invention comprehends a tool for non-chemical water treatment wherein water flowing through the tool is subjected to a magnetic field that exerts a magnetic flux on the flowing water due to the design characteristics and physical arrangement of the magnetic and non-magnetic components of the tool. More specifically, the tool has an elongated casing within which an array of magnets are housed. The magnets are arranged respective to the water flow path therethrough to utilize the phenomena of magneto hydro dynamics and to thereby change some of the characteristics of the flowing water. The magneto hydro dynamics tool of this invention prohibits scale build-up in new pipes and progressively removes scale from existing pipes, boilers, water towers, heat exchange units, and potable domestic water systems.

Accelerating the suspended particles in water through an intensified controlled magnetic field, initiates a reaction that alters the character of the solids so that they no longer provide a crystal seed, thereby controlling and preventing crystal growth in pipelines, for example. Existing deposited particles are also affected by these charged particles and as a consequence, the existing deposits of scale are gradually carried away.

More specifically, the present invention takes advantage of the phenomena of magneto hydro dynamics, hereinafter called MHD or MHD water treatment, by mounting magnets within a casing along a longitudinally extending, common central axis. The magnets are arranged with like poles adjoining one another and the fluid flow path forces the fluid through the magnetic field that surrounds each magnet.

The MHD fluid treatment tool of this invention is designed whereby all of the fluid to be treated passes through a plurality of magnetic intersects arranged perpendicularly respective to a magnetic field to thereby produce the maximum MHD effect. The tool is installed in series relationship in a flow line and no other power source, chemicals or tools are required to operate the tool of the present invention.

Still more specifically, the tool of this invention is for treating a liquid that may flow therethrough. The tool has an annular casing with an inlet end that can be connected to a conduit to receive flow therefrom, an outlet end from which treated liquid can be discharged therefrom; and an assembly of magnets are supported within the casing. The assembly of magnets includes a plurality of axially spaced holding members, a magnet supported between each holding member, a socket in each holding member of a size to telescopingly receive and support the end of a magnet therewithin, and, means holding the assembly of magnets within the casing, so that fluid flowing through the tool is subjected to the magnetic field of the magnets.

A primary object of the present invention is the provision of both method and apparatus for non-chemical treatment of water that involves processing the water magnetically.

Another object of the invention is to provide a tool for non-chemical treatment of water by subjecting water to MHD as it flows through the tool.

A further object of this invention is to disclose and provide a tool for MHD treatment of liquids.

A still further object of this invention is to provide a casing having magnets arranged therein in a manner to subject a flowing fluid to MHD.

Another and still further object of this invention is the provision of a tool for non-chemical treatment of liquid by flowing a stream of liquid through an array of magnets.

These and various other objects and advantages of the invention will become readily apparent to those skilled in the art upon reading the following detailed description and claims and by referring to the accompanying drawings.

The above objects are attained in accordance with the present invention by the provision of a method for use with a tool which is fabricated in a manner substantially as described herein.

BRIEF DESCRIPTION OF THE DRAWINGS

FIG. 1 is a part cross-sectional, side elevational view of a treatment tool made in accordance with this invention, and shown in dissembled relationship respective to a flow system;

FIG. 2 is an enlarged, longitudinal part cross-sectional view of the tool of FIG. 1;

FIG. 3 is an exploded view of part of the tool of FIG. 2; and,

FIG. 4 is a cross-sectional view taken along line 4—4 of FIG. 2.

DETAILED DESCRIPTION OF THE PREFERRED EMBODIMENT

The drawings disclose a MHD water treatment tool 10, made in accordance with this disclosure. As seen in FIG. 1, the MHD water treatment tool 10 is comprised of an annular casing 12, preferably made of (410) stainless steel, and therefore is magnetic. Flanges 14 and 16, respectively, are attached at opposed inlet and outlet ends, respectively, of casing 12. Fluid flowing along a conduit at 18 can enter the inlet flange 14 where it can be treated by the treatment tool 10. The treated fluid exits outlet flange 16 as indicated by numeral 20.

Within annular casing 12 is an assembly of magnets 22 comprising an array of magnets supported from the interior wall of the casing and arranged in the manner seen in FIGS. 2, 3 or 4. The magnets preferably are cylindrical in cross section, with there being a North pole opposed to a South pole and with the like poles adjoining one another.

As seen in FIG. 2, a plurality of axially aligned, spaced apart, commercially available magnets 24, 26 and 28 are mounted in spaced, axially aligned relationship respective to one another by inner holding members 30 and 32, and outer holding members 34 and 36. Holding members 30-36 are made of non-magnetic stainless steel. Holding members 30 and 32 have a socket formed at both ends thereof and holding members 34-36 have a socket formed at one end thereof for telescopingly receiving the end of a magnet snugly therewithin.

As shown in FIGS. 3 and 4, three circumferentially spaced, elongated, non-magnetic, stainless steel tension rods 38, 40, 42 are fastened to outer holding members 34, 36. The three elongated stainless steel tension rods preferably are solid, round members and may extend almost to the outermost end of outer holding members 34 and 36. Preferably the three tension rods 38, 40 and 42 are spaced 120 degrees apart and are affixed by welding to the two outer holding members 34 and 36 to thereby hold the entire assembly of magnets 22 together.

As seen in FIG. 4, this configuration divides the annulus formed between the casing interior wall and the exterior of each outer holding member 34 and 36 of assembly of magnets 22 into segmented, circumferentially extended flow paths comprised of spaces 44, 46 and 48. The inner holding members 30 and 32 do not extend into attached relationship respective to the three tension rods 38, 40, 42. The outer diameter of the assembly of magnets 22 preferably is of a size to be held within the casing by friction, but alternatively, it can be held positioned therewithin in any number of other different manners, as may be desired.

A plurality of annular spaces 50, 52 and 54 is formed between adjacent holding members 30-36. The spaces 50-54 are irregular in shape and are joined by the before mentioned spaces formed between the interior wall 74 of the casing, the outer wall of the enlargements, and the outer wall of the tension rods. The annular spaces about outer holding members 34 and 36 are segmented as noted above.

The holding members 30-36 each have a medial length thereof that enlarges as seen at 56 in FIGS. 2 and 3, to form a circumferentially extending shoulder. The outer periphery of the shoulder of the outer holding members 34 and 36 are joined to a medial length of the three tension rods 38, 40 and 42, as herebefore noted.

The intermediate or inner holding members 30, 32 are spaced from and therefore are not attached to the tension rods. The inner holding members 30, 32 have opposed sockets 58 and 60 that securely and contactingly receive the marginal end of adjoining magnets 24, 26, 28 in close tolerance relationship therewithin. The sockets bottom out as noted by numeral 62 of FIG. 2 by reducing the inner diameter thereof or by the provision of a wall member at 62. It is preferred to leave a magnetic passageway between adjoining magnets 24, 26, 28 by leaving an opening in wall 62 between adjacent sockets. Numerals 64, 64' indicate the opposed sockets of inner holding member 30 and correspond to the sockets 58, 60 of inner holding member 32.

Numerals 66, 68 illustrate the streamlined or bullet nose that forms the terminal ends of the opposed outer holding members 34, 36. Numerals 70, 72 illustrate the opposed terminal ends of the parallel tension rods 38, 40 and 42.

The magnets are arranged within holding members 30-36 with like poles of adjoining magnets confronting one another. The ends of the magnets are held aligned within the holding members by the individual sockets. The tension rods are affixed to enlargement 56 of the outermost holding members to secure the magnets and holding members in compression and thereby forms the assembly of magnets 22. The assembly of magents 22 is telescoped into tool casing 12 and secured in place by friction, welding, cementing, or any other suitable arrangement.

The adjoining magnets 24, 26, 28 are spaced about ⅜ inch apart by the socket wall 62. Each magnet is surrounded by a magnetic field through which the water must flow, and in so doing, is magnetically charged as it progresses through the tool.

In operation, the assembly of magnets 22 is inserted in casing 12 of treatment tool 10, as seen in FIG. 1. The tool is then placed in series relationship respective to a flow line through which fluid, such as water, to be treated is flowing, as seen at 18 and 20, whereby the water flowing through treatment tool 10 is polarized by the magnetic field that surrounds the magnets, together with the magnetic and non-magnetic stainless steel components which form a novel magnetic circuit and treats the water as the water passes through the magnetic circuitry.

Each magnet 24, 26, 28 cooperates with casing 12 to form a magnetic field at each end of each magnet through which water is forced to flow. The water is therefore forced to flow through the North/South magnetic field a plurality of times as it passes about the holding members from annular spaces 50, 52 and 54.

The magnets preferably are solid metal alloy, such as the rare earth cobalt alloys permanent magnets, other permanent magnets made from chromium/cobalt/iron; or magnets made from high induction soft magnetic silicon steel can also be used.

I claim:

1. A tool for the treatment of water flowing therethrough, comprising:

an annular casing that can be connected in series relationship respective to a flow conduit to thereby establish flow therethrough;

an assembly of magnets housed within said casing, said assembly having opposed ends, said assembly of magnets includes spaced holding members, said holding members are axially aligned and axially spaced respective to one another, said assembly of magnets terminate in an outer holding member located at each said opposed end thereof, a said magnet arranged between adjacent said holding members, a socket in each of said holding members of a size to telescopingly and contactingly receive a marginal end of a respective said magnet therewithin; and means holding the assembly of magnets within the casing;

said magnets each have a longitudinal axis, said magnets are arranged along a common axis with like adjacent poles;

an enlargement on each said outer holding member, said means holding the assembly of magnets include elongated rods attached to the enlargement of each said outer holding member at each said opposed end of the assembly, each said rod extending from one said outer holding member to the other of said outer holding members with the rods bearing against an interior wall of the casing and holding the assembly of magnets in assembled relationship within the casing;

whereby, fluid flow through said tool is forced to flow about each said magnet and thereby flow through the magnetic flux of each magnet.

2. The tool of claim 1 wherein the holding members include a plurality of adjacent inner holding members each having opposed sockets for receiving adjoining magnets therewithin, and each said outer holding member having a streamlined terminal end opposed to the socket thereof.

3. The tool of claim 1 wherein said casing has a central axis and said magnets are elongated cylinders having opposed marginal ends; said magnets are axially aligned along the central axis of said casing; there are a plurality of adjacent inner holding members, each inner holding member has opposed sockets for receiving adjoining magnets therewithin; and each said outer holding member has a streamlined terminal end opposed to the socket thereof.

4. The tool of claim 1 wherein said casing is of annular construction and has a central axis, said magnets are of cylindrical configuration and are arranged along the casing central axis.

5. The tool of claim 1 wherein said holding members include a plurality of adjacent inner holding members, each having opposed sockets for receiving a marginal end of adjoining magnets therewithin, each said outer holding member having a streamlined terminal end opposed to the socket thereof, said magnets are arranged along a common axis that is parallel to the casing, said elongated rods are arranged parallel to one another and to the casing, said enlargement of the outer holding members is spaced from the interior wall surface of said casing by said rods.

6. A tool for magnetic treatment of fluid flowing therethrough, comprising:

an annular casing having an interior wall and a central axis, said tool is adapted to be connected in series relationship respective to a flow conduit to receive flow from the conduit when connected thereto;

an assembly of magnets housed within the casing, said assembly having opposed ends;

a plurality of holding members within said annular casing, said holding members are axially aligned and axially spaced respective to one another, a respective one of said plurality of magnets is supported between adjacent holding members;

said holding members being comprised of one outer holding member located at each said opposed end of said assembly with an inner holding member therebetween;

diametrically opposed outwardly opening sockets in each said inner holding member of a size to telescopingly receive a marginal end of a magnet therewithin;

said magnets are arranged with like adjacent poles;

an enlargement on each said outer holding member;

each said outer holding member having a socket formed therein that is opposed to a terminal end thereof to telescopingly and contactingly receive a marginal end of a respective said magnet therewithin;

a plurality of rods, each of said rods are parallel to the central axis of said annular casing, said rods are attached to the enlargement of each said outer holding member, each said rod extending from one said outer holding member to the other said outer holding member with said rods bearing against the interior wall of the casing and securing the assembly of magnets within the casing;

whereby, fluid can flow between the enlargements and the interior wall of the casing and through the magnetic flux associated with each of the magnets.

7. The tool of claim 6 wherein said magnets are arranged along said central axis, and said elongated rods are spaced 120 degrees apart and hold the assembly of magnets in assembled relationship within the casing.

8. The tool of claim 7 wherein, the outer holding members have a streamlined terminal end opposed to the socket thereof.

9. The tool of claim 6 wherein said magnets are elongated cylinders having opposed marginal ends and are axially aligned along the central axis of said casing, each outer holding member having a streamlined terminal end opposed to the socket end thereof.

10. The tool of claim 6 wherein said magnets are arranged in spaced relationship along a common axis, and each said enlargement is spaced from the interior wall surface of said casing by said rods.

* * * * *